May 19, 1964 B. H. HARRISON 3,134,015

HIGH SPEED DECADE COUNTERS

Filed Feb. 3, 1961

INVENTOR
BLAIR H. HARRISON
BY J. C. Chapman
ATTORNEY

United States Patent Office 3,134,015
Patented May 19, 1964

3,134,015

HIGH SPEED DECADE COUNTERS

Blair H. Harrison, Sunnyvale, Calif., assignor to Hewlett-Packard Company, Palo Alto, Calif., a corporation of California Filed Feb. 3, 1961, Ser. No. 87,003
5 Claims. (Cl. 235—92)

Figure 1:
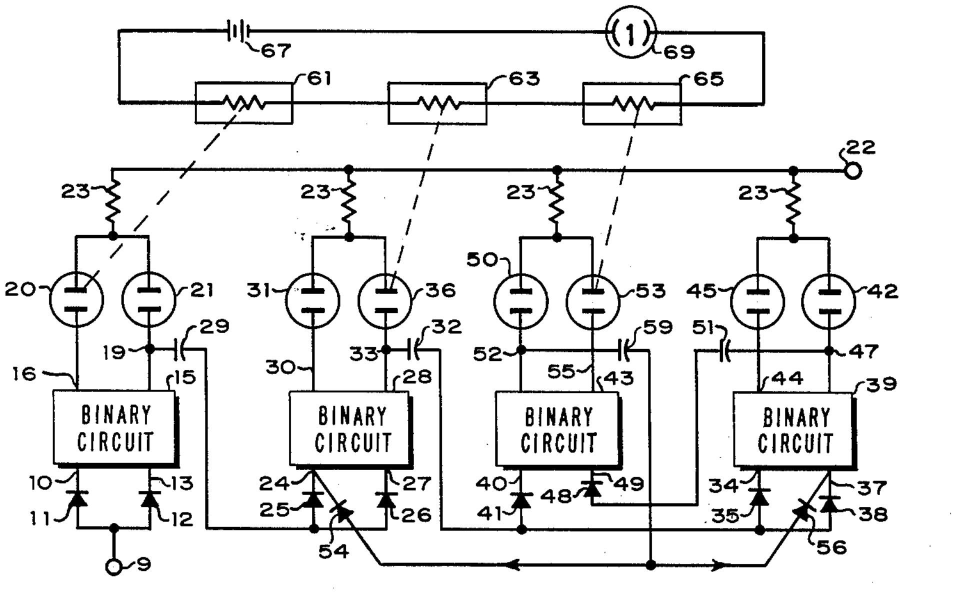

This invention relates to decade counting circuits, and more particularly to methods and means for increasing their counting speed.

Electronic counters are frequently used to count accurately pulses that recur at very high repetition rates. Bistate devices or switching elements are used to perform the counting operations. These elements operate only in either one of two discrete states which correspond to maximum and minimum levels of applied pulses. The two state devices are ideal for counting electrical events in a number system having a radix of two. (A "radix" is a number that is arbitrarily made the base number of a numbering system; thus 10 is the radix of the decimal number system.) Common use of the decimal number system requires that electronic counters be capable of counting in decades or powers of ten using two-state or binary elements. A circuit containing four binary elements provides a total of sixteen possible operating states which may be made to correspond to the number of pulses applied thereto. The output signals of successively arranged binary elements usually are assigned number values of 1, 2, 4, and 8. This arrangement of output signals provides an indication of the sixteen different combinations of operating states. In order to perform a decade counting operation using binary counting elements, then, it is necessary to eliminate six of the sixteen possible operating states of the four-element circuit. The conventional method of eliminating the six additional operating states is to feed pulses back at different counting stages from the third and fourth switching elements to the second and third switching elements, respectively. This requires two feedback paths and, since the switching elements require a finite response time, produces two delay times. (See Millman and Taub, Pulse and Digital Circuits, pp. 325–334, McGraw-Hill Book Company, New York, 1956.) The delay caused by the response time of the switching elements to each of the feedback signals of the conventional decade counter appreciably reduces the speed at which the counter can operate.

It is desirable to eliminate the six additional operating states by simultaneously providing feedback signals at one particular circuit state in the counting operation. This permits more rapid counting to take place since the feedback signals occur simultaneously and thus produce only one delayed response time. In order to provide a counting circuit which will operate in this manner, it is necessary to assign weights or values to the output signals of successively arranged binary elements that do not correspond to consecutively increasing exponent powers of two. If the weights given to the output signals of the switching elements are properly chosen, then feedback signals occurring in the four-element circuit at one particular operating state can be used to provide a faster speed decade counter. It is particularly desirable to assign weights to the output signals of successively arranged switching elements to provide a 1, 2, 2, 4 weighted number code for convenience in identifying the ten discrete combinations of operating states of the four switching elements.

Accordingly, it is an object of the present invention to provide a decade counting circuit which will operate at greater counting speeds than conventional decade counting circuits.

It is another object of the present invention to provide a decade counting circuit which produces feedback signals at only one circuit state during the counting operation.

It is a further object of the present invention to provide a decade counting circuit which is less complex and less expensive than conventional decade counting circuits.

In accordance with the illustrated embodiment of the present invention, four bistate switching elements are connected to perform a decimal counting operation using binary logic. The output signals of the switching elements of the present invention are arbitrarily assigned number values or code weights. The 1, 2, 2, 4 weighted number code used in the circuit of the present invention provides a fast, reliable decade counting circuit, since the feedback signals used therein occur simultaneously at only one particular circuit state in the counting operation. In addition, since the feedback signals are derived from only one of the switching elements, the circuit complexity and concomitant expense are reduced.

Figure 2:
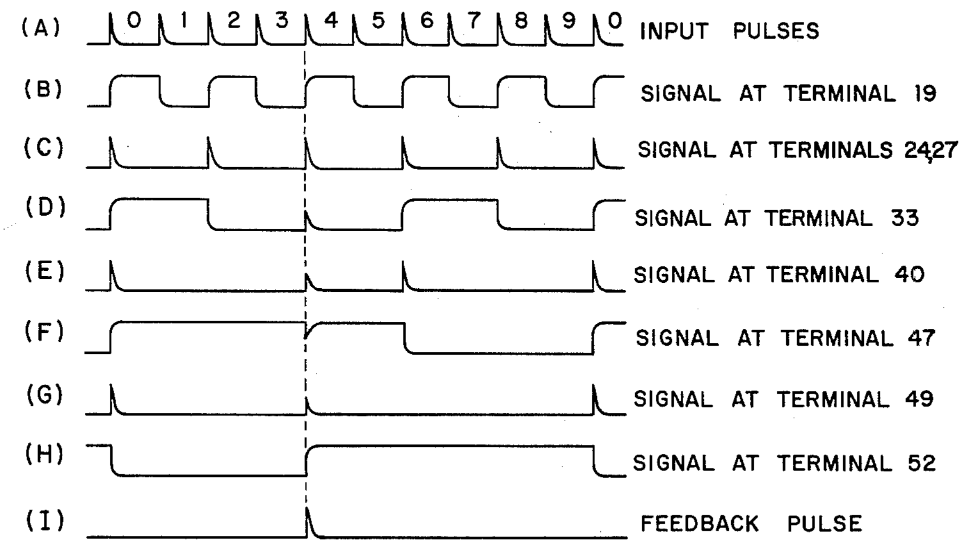

Other and incidental objects of the present invention will be apparent from a reading of the specification and an inspection of the accompanying drawing in which:

FIGURE 1 is a schematic diagram of a decade counting circuit in accordance with the present invention, and FIGURE 2 is a graph showing the relationships between various waveforms of the circuit of FIGURE 1.

Referring now to FIGURE 1, there is shown a circuit containing four switching elements or binary circuits, each having two input terminals and two output terminals. The pulses to be counted which appear at terminal 9 are applied to input terminals 10 and 13 of binary circuit 15 through diode 11 and 12, respectively. Output terminals 16 and 19 are connected to indicator lamps 20 and 21, respectively. Output terminal 19 is connected through coupling capacitor 29 to each of input terminals 24 and 27 of binary circuit 28 through diodes 25 and 26, respectively. Output terminal 30 is connected to indicating lamp 31 and output terminal 33 is connected to indicating lamp 36. Output terminal 33 is connected to input terminal 40 of binary circuit 43 through coupling capacitor 32 and diode 41, and is connected to input terminals 34 and 37 of binary circuit 39 through the coupling capacitor 32 and diodes 35 and 38, respectively. Output terminal 44 is connected to indicating lamp 45, and output terminal 47 is connected to indicating lamp 42. Output terminal 47 is also connected to input terminal 49 of binary circuit 43 through coupling capacitor 51 and diode 48. Output terminals 52 and 55 are connected to indicating lamps 50 and 53, respectively. Output terminal 52 is connected to input terminal 24 through coupling capacitor 59 and diode 54, and to input terminal 37 through coupling capacitor 59 and diode 56. The common terminals of the indicating lamps for each of the binary circuits is connected to a voltage source 22 through identical resistors 23. A first series circuit including photoconductive elements 61, 63, and 65 and voltage source 67, is connected between the electrodes of read-out lamp 69.

In operation, the pulses to be counted, which appear at input terminal 9, are applied to input terminals 10 and 13 of binary circuit 15. Binary circuit 15 operates only in either one of two operating states. These operating states are identified by the levels of the output signals which appear at the output terminals 16 and 19. Binary circuit 15 is in one operating state when the amplitude of the signal appearing at output terminal 16 is low and the amplitude of the signal appearing at output terminal 19 is high. The circuit is in the other operating state when the relative amplitudes of the signals appearing at the output terminals are reversed. In addition, when a pulse of proper polarity is applied to input terminal 10, the signal appearing at output terminal 16 is low and will not be changed by the subsequent application of the same polarity pulse to the same input terminal. When a pulse of proper polarity is subsequently applied to input terminal 13, the amplitude of the signal appearing at output terminal 16 changes from low to high, and the amplitude of the signal appearing at output terminal 19 remains low. Subsequent application of the same polarity pulses to the same input terminal will not change the amplitude of the signal appearing at output terminal 19. Diodes 11 and 12 serve to make binary circuit 15 sensitive only to one polarity input pulse. The circuit is designed to change from one operating state to the other upon application of proper polarity pulse to the sensitive input terminal, i.e., the input terminal which is capable of producing a change in the operating states. Generally, then, when the relative amplitude of a pulse applied to an even numbered input terminal is high, the relative amplitude of the signal appearing at the even numbered output terminal is low, and the relative amplitude of the signal appearing at the odd-numbered output terminal is high. The converse is true for a pulse applied to the odd-numbered input terminal. In practice, when the diodes at the inputs of the binary circuits are connected as shown in FIGURE 1, the terms "relatively high amplitude signal" indicate a high or large negative voltage while the terms "relatively low amplitude signal" indicate a low or small negative voltage.

Thus pulses of one polarity appearing at input terminal 9, when applied to input terminals 10 and 13 simultaneously, cause binary circuit 15 to alternate between the two operating states, thereby producing an ouput signal at terminal 19 which has alternate values of relatively high and low amplitude. The differentiating circuit comprising coupling capacitor 29 and the equivalent input impedance of binary circuit 28, serves to differentiate the signal that appears at output terminal 19, and to produce pulses of short duration each time the amplitude of the output signal appearing at terminal 19 changes value. The operation of binary circuit 28 is substantially similar to the operation previously described for the binary circuit 15. Diodes 25 and 26 allow only the pulse of proper polarity to appear at the input terminals. Thus the pulses appearing at input terminals 24 and 27 have a polarity to which binary circuit 28 is responsive and have a repetition rate that is precisely one-half the repetition rate of the pulses appearing at input terminal 9. The amplitude of the signal appearing at output terminal 33 thus alternates between maximum and minimum values in response to the signal applied to input terminals 24 and 27. The pulses which are derived from the signal that appears at output terminal 33 are applied to input terminals 34 and 37 of binary circuit 39 and, in addition, are applied to input terminal 40 of binary circuit 43. The diodes at the input terminals of binary circuits 39 and 43 allow only the pulses of proper polarity to appear at the input terminals. Resistors of equal value may be used in place of all the input diodes since only one input terminal is sensitive to applied pulse of any given time.

The circuit described thus far is capable of dividing the number of pulses appearing at input terminal 9 by two; i.e., the circuit is capable of producing a pulse of one polarity at input terminals 24 and 27 for each two pulses applied to input terminal 9, and a pulse of one polarity at input terminals 34, 37, and 40 for each four pulses appearing at input terminal 9.

The fourth pulse appearing at input terminal 9 causes binary circuit 28 to change state. This, in turn, causes binary circuits 39 and 43 to change operating states. At this time, feedback pulses are derived from output terminal 52 of binary circuit 43, and are simultaneously applied to input terminal 24 of binary circuit 28 and to input circuit 37 of binary circuit 39. This causes binary circuit 28 to return to the state in which it was operating just prior to the application of the fourth input pulse. In addition, the feedback pulse applied to binary circuit 39 causes the circuit to return to the state in which it was operating just prior to the application of the fourth input pulse. The response time of binary circuits 39 and 28 to the feedback signals derived from binary circuit 43 may be so chosen that the states of operation just prior to the application of the fourth input pulse are only momentarily changed and are immediately restored.

The momentary change in the operating state of binary 39 produces an output pulse at terminal 47 which is applied to the input terminal 49 of binary circuit 43. Since the change in the operating state of binary circuit 43 produces the feedback signal which returns binaries 28 and 39 to the previous operating states, it is necessary to consider the effect of the resulting pulse that appears at input terminal 49. Binary circuit 43 is in the process of changing operating state when the pulse from binary 39 is applied to input terminal 49. As is commonly known to those skilled in the art, a binary circuit is relatively insensitive to applied signals during the period of regeneration or change in the operating state. Thus the transition from one operating state to the other which takes place in binary circuit 43 is not affected by the momentary change that occurs in the operating state of binary circuit 39.

The circuit continues to operate substantially as a conventional binary counter following the appearance of the fourth input pulse and the resulting feedback signals. A pulse is derived from the signal appearing at output terminal 33 of binary circuit 28 at the instant when the second subsequent pulse appears at input temrinal 9. This pulse cannot produce a change in the operating state of binary circuit 43, since it is applied to the insensitive input terminal thereof. However, the pulse that is derived from the output terminal 33 of binary circuit 28 is capable of changing the operating state of binary circuit 39. The change in state does not affect the operation of the circuit at this time. An output pulse subsequently appears at output terminal 47 of binary circuit 39 when binary circuit 28 commences to change operating state for the third time following the appearance of the feedback signal. The pulse thus derived from output terminal 47 is capable of changing the operating state of binary circuit 43 back to the operating state which existed just prior to the application of the fourth pulse to be counted. Thus, after binary circuit 15 changes operating state ten times, the circuit is returned to the original operating state which existed just prior to the appearance at terminal 9 of the pulses to be counted.

The output terminals of each of the four binary circuits are connected to their respective indicating lamps. The operating state of each of the binary circuits is identified by the lamp that is made luminant or, more exactly, by the relative amplitude of signals appearing at their output terminals. The ten operating states of the entire circuit, then, can be identified by the combinations of luminant indicating lamps. It is evident that the particular combinations of operating states can thus be made to correspond to the number of pulses which appeared at input terminal 9. A particular combination of operating states, such as is necessary to indicate the application of one pulse, may be interpreted directly by photoconductive elements 61, 63 and 65 which are illuminated by indicating lamps 20, 36 and 53, respectively. Other combinations of photoconductors and indicating lamps may be used to provide each of the ten characters or digits 69 of a decade counting unit. Thus, by using the 1, 2, 2, 4 weighted code as described herein, the combinations of operating states may be identified by using three and only three of the binary circuit outputs for each of the ten discrete circuit states.

The circuits of the present invention may be arranged in cascade by applying the signal that appears at output terminal 55 of binary circuit 43 to the input terminal 9 of a successively arranged circuit. Pulses which are applied to circuits arranged in this manner are thus counted and displayed by the first circuit in accordance with the units representation of a number, by the second circuit in accordance with the tens presentation of a number, by the third circuit in accordance with the hundreds representation of a number, and so on.

Referring now to the graph of FIGURE 2, there is shown in FIGURE 2A a train of repetitive pulses which are to be counted. FIGURE 2B represents the signal which appears at output terminal 19 of binary circuit 15 for pulses appearing at input terminal 9. The pulses which are applied to the input terminals of binary circuit 28 are shown in FIGURE 2C. These pulses appear each time transition from a low level to a high level operating state occurs at output terminal 19. Binary circuit 28 is adapted to be responsive only to pulses of one polarity. By way of example, the pulses of FIGURE 2C are shown only as positive polarity pulses. The amplitude of the signal appearing at output terminal 33 is changed only by the appearance at input terminal 9 of alternate pulses to be counted. Output terminal 47 of binary circuit 39 has a waveform that is represented by FIGURE 2F, and output terminal 52 of binary circuit 43 has an output signal that is represented by FIGURE 2H.

Upon application of the fourth pulse to be counted, the output signal of binary circuit 28 commences to change state in a normal manner, as shown in FIGURE 2D. This transition produces a pulse which is applied to binary circuits 39 and 43, which pulse tends to change the operating state of binary circuit 39 as shown in FIGURE 2F. The change which takes place in the operating state of binary circuit 43 is shown in FIGURE 2H. The pulse which results from the change of state of binary circuit 43 is the feedback pulse of FIGURE 2I which is simultaneously fed back to binary circuit 28 and to binary circuit 39, thereby returning the circuit to the operating states which existed just prior to the application of the fourth pulse to be counted. The response of the binary circuits 39 and 28 to the change of state of binary circuit 43 thus appears as a small variation in amplitude in waveforms of FIGURE 2F and FIGURE 2D, respectively.

Following the application of the fourth pulse, the circuit operates substantially as a binary counter advanced six counting states beyond the fourth state. This is evident from an inspection of the resulting waveforms of binary circuits 28, 39, and 43, as shown in FIGURES 2E, 2F, and 2H, respectively. The application of the tenth pulse to be counted returns the binary circuit 43 to its original operating state, thereby producing an indication that a decimal number of pulses have appeared at input terminal 9.

Therefore, the circuit of the present invention uses binary circuit elements to produce a decimal indication of the number of pulses applied thereto. The circuit of the present invention develops a feedback signal from only one of the four binary elements, which signal is fed simultaneously to two other binary elements at one particular circuit state during the counting operation. The circuit is thus capable of counting at a faster rate than conventional circuits which develop two feedback signals at two separate operating states during the counting operation, since only one delayed response time to feedback signals during the counting operation is encountered. In addition, the present circuit attains greater operating reliability when operated at very high pulse repetition rates, because there are no unwanted pulses tending to drive the binary circuits in the wrong direction. Also, since the feedback signals originate from only one point, the present circuit is less complex and less expensive than conventional decade counting circuits.

I claim:

1. A decade counting circuit for counting recurring electrical signals according to the decimal number system using binary logic elements which operate only in either one of two operating states, said circuit comprising a first binary circuit responsive to input signals of one polarity, means to apply said electrical signals to the input of said first binary circuit, a second binary circuit responsive to input signals of one polarity, means to apply the output signal of said first binary circuit to the input of said second binary circuit, third and fourth binary circuits responsive to input signals of one polarity, means to apply the output signal of said second binary circuit to the inputs of said third and fourth binary circuits, means to apply the output signal of said fourth binary circuit to the input of said third binary circuit, means to apply simultaneously the output signal of said third binary circuit to the inputs of said second and fourth binary circuits at a preselected count, and means for evaluating the combinations of said operating states of said first, second, third, and fourth binary circuits to provide a decimal indication of the number of said electrical signals applied to said decade counting circuit.

2. A decade counting circuit for counting recurring electrical signals according to the decimal number system using binary logic elements which operate only in either one of two operating states, said circuit comprising a first binary circuit having two input terminals and at least one output terminal and being responsive to input signals of one polarity, means to apply said electrical signals to the input terminals of said first binary circuit, a second binary circuit having two input terminals and at least one output terminal and being responsive to input signals of one polarity, means to apply the signal appearing at the output terminal of said first binary circuit to the input terminals of said second binary circuit, third and fourth binary circuits which operate only in either one of two operating states and are responsive to input signals of one polarity, means to apply the signal appearing at the output terminal of said second binary circuit to the input terminals of said fourth binary circuit and to one input terminal of said third binary circuit, means to apply the signal appearing at the output terminal of said fourth binary circuit to the other input terminal of said third binary circuit, means to apply the signal appearing at the output terminal of said third binary circuit simultaneously to the input terminals of said second and fourth binary circuits at a preselected count, and means for evaluating the combinations of said operating states of said first, second, third, and fourth binary circuits to provide a decimal indication of the number of said electrical signals applied to the input terminals of said first binary circuit.

3. A decade counting circuit for counting recurring electrical signals according to the decimal number system using binary logic elements which operate only in either one of two operating states, said circuit comprising a first binary circuit having two input and two output terminals and adapted to change from one operating state to the other operating state in response to input signals of one polarity applied to said input terminals, means to apply said electrical signals to the input terminals of said first binary circuit, a second binary circuit having two input and two output terminals and adapted to change from one operating state to the other operating state in response to input signals of one polarity applied to said input terminals, means to apply the signal appearing at one output terminal of said first binary circuit to the input terminals of said second binary circuit, third and fourth binary circuits having two input and two output terminals and adapted to change from one of the operating states to the other of the operating states in response to input signals of one polarity applied to said input terminals, means to apply the signal appearing at one output terminal of said second binary circuit to the input terminals of said fourth binary circuit and to one input terminal of said third binary circuit, means to apply the signal appearing at one output terminal of said fourth binary circuit to the other input terminal of said third binary circuit, means to apply simultaneously the signal appearing at one output terminal of said third binary circuit to the input terminals of said second and fourth binary circuits in response to the first change in the operating state of said third binary circuit, and a utilization circuit for evaluating the combinations of said operating states of said first, second, third, and fourth binary circuits to provide a decimal indication of the number of said electrical signals applied alternately to the input terminals of said first binary circuit.

4. A decade counting circuit for counting recurring electrical pulses according to the decimal number system using binary logic elements which operate only in either one of two operating states, said circuit comprising first, second, third, and fourth binary circuits having left and right side input terminals and left and right side output terminals, said binary circuits being adapted to change from the operating states identified by relatively high amplitude signals appearing on said right output terminals and relatively low amplitude signals appearing on said left output terminals to the other operating states identified by relatively low amplitude signals appearing on said right output terminals and relative high amplitude signals appearing on said left output terminals in response to signals of one polarity applied to the sensitive input terminals thereof, which sensitive input terminals are the input terminals that correspond to the output terminals on which signals of relatively high amplitude appear, means to apply said electrical pulses to the left and right input terminals of said first binary circuit, means to apply the signal appearing on the right output terminal of said first binary circuit to the left and right input terminals of said second binary circuit, means to apply the signal appearing on the right output terminal of said second binary circuit to the left input terminal of said third binary circuit and to the left and right input terminals of said fourth binary circuit, means to apply the signal appearing on the right output terminal of said fourth binary circuit to the right input terminal of said third binary circuit, means to feed back the signal appearing on the left output terminal of said third binary circuit to the left input terminal of said second binary circuit and to the right input terminal of said fourth binary circuit, a utilization circuit connected to the left and right output terminals of said first, second, third, and fourth binary circuits, and means including said utilization circuit for evaluating the combinations of said operating states of said binary circuit to provide a decimal indication of the number of said electrical pulses applied to the left and right input terminals of said first binary circuit.

5. A decade counting circuit for counting recurring electrical pulses according to the decimal number system using binary logic elements which operate only in either one of two operating states, said circuit comprising first, second, third, and fourth binary circuits having left and right side input terminals and left and right side output terminals, said binary circuits being adapted to change from the operating states identified by relatively high amplitude signals appearing on said right output terminals and relatively low amplitude signals appearing on said left output terminals to the other operating states identified by relatively low amplitude signals appearing on said right output terminals and relatively high amplitude signals appearing on said left output terminals in response to signals of one polarity applied to the sensitive input terminals thereof, which sensitive input terminals are the input terminals which correspond to the output terminals on which signals of relatively high amplitude appear, means to apply said electrical pulses to the left and right input terminals of said first binary circuit, means including a first capacitor to apply the signal appearing on the right output terminal of said first binary circuit to the left and right input terminals of said second binary circuit, means including a second capacitor to apply the signal appearing on the right output terminal of said second binary circuit to the left input terminal of said third binary circuit and to the left and right input terminals of said fourth binary circuit, means including a third capacitor to apply the signal appearing on the right output terminal of said fourth binary circuit to the right input terminal of said third binary circuit, means including a fourth capacitor to feed back the signal appearing on the left output terminal of said third binary circuit to the left input terminal of said second binary circuit and to the right input terminal of said fourth binary circuit, said fourth capacitor being smaller than said first, second, and third capacitors, a utilization circuit connected to the left and right output terminals of said first, second, third, and fourth binary circuits, and means including said utilization circuit for evaluating the combinations of said operating states of said binary circuit to provde a decimal indication of the number of said electrical pulses applied to the left and right input terminals of said first binary circuit.

References Cited in the file of this patent

UNITED STATES PATENTS

| | | |
|---|---|---|
| 2,540,024 | Bergfors | Jan. 30, 1951 |
| 2,562,591 | Wagner et al. | July 31, 1951 |